United States Patent [19]
Caine et al.

[11] Patent Number: 4,794,592
[45] Date of Patent: Dec. 27, 1988

[54] SERIAL NETWORK ARCHITECTURE FOR USER ORIENTED DEVICES

[75] Inventors: Nathanael T. Caine, Sunnyvale, Calif.; Jean-Jacques Simon, Saint-Egreve, France

[73] Assignee: Hewlett-Packard Company, Palo Alto, Calif.

[21] Appl. No.: 84,965

[22] Filed: Oct. 6, 1987

Related U.S. Application Data

[60] Division of Ser. No. 861,650, May 5, 1986, Pat. No. 4,703,473, which is a continuation of Ser. No. 625,944, Jun. 29, 1984, abandoned.

[51] Int. Cl.$^4$ ............................ H04J 3/02; H04B 3/36
[52] U.S. Cl. .......................................... 370/85; 370/87; 370/97

[58] Field of Search .................. 370/85, 86, 87, 88, 370/15, 96, 97; 379/4, 5, 22, 26; 340/825.5, 825.05

[56] References Cited

U.S. PATENT DOCUMENTS

| | | | |
|---|---|---|---|
| 4,402,075 | 8/1983 | Bargeton et al. | 370/97 |
| 4,703,473 | 10/1987 | Caine et al. | 370/15 |

Primary Examiner—Robert L. Griffin
Assistant Examiner—Frank M. Scutch, III

[57] ABSTRACT

A serial network architecture is presented which can be used to link user oriented devices together. Network devices are linked together in serial fashion. If data is transmitted serially, an interface between two devices requires only two wires. Additionally, a wire for power and a wire for ground may be added so that each individual network device does not need to have its own power supply.

1 Claim, 4 Drawing Sheets

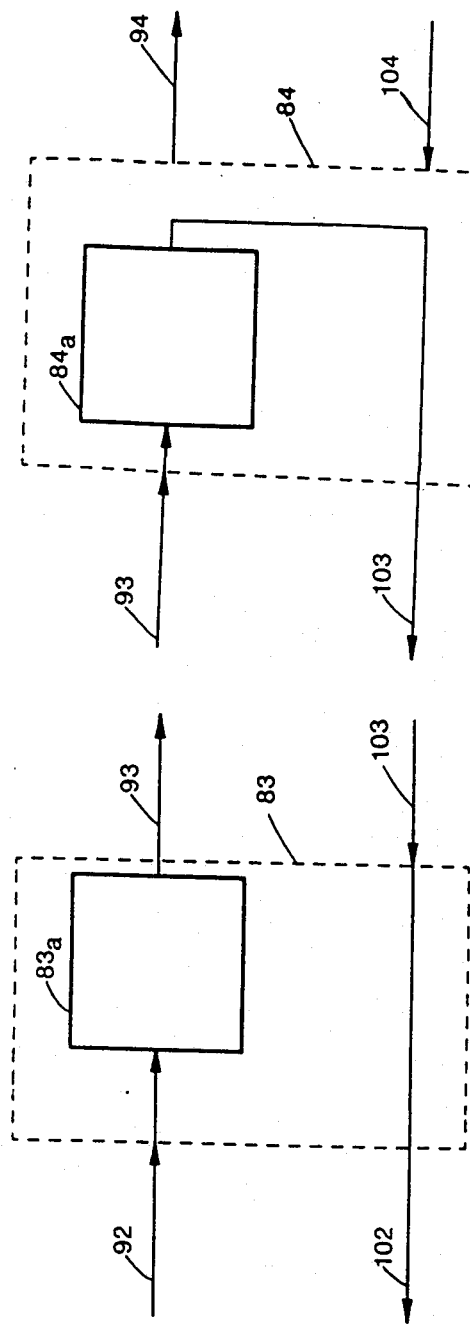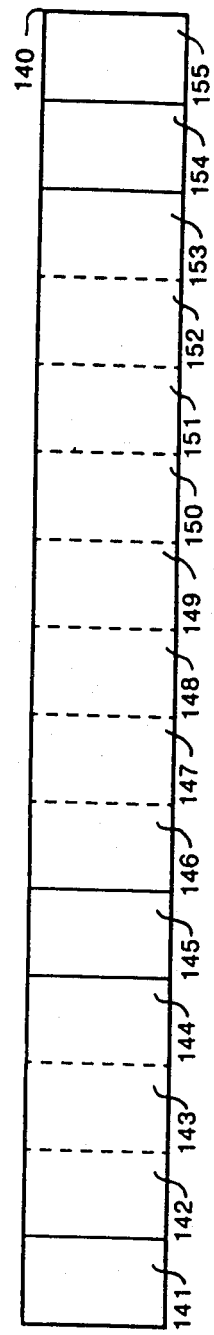

SERIAL NETWORK ARCHITECTURE FOR USER ORIENTED DEVICES

This is a divisional of 06/861,650, 05/05/86, now U.S. Pat. No. 4,703,473 which is a continuation of 06/625,944, 06/29/84, abandoned.

BACKGROUND

Prior art network architectures are shown in FIGS. 1-3. FIG. 1 shows a star network where a central device 10 is coupled as shown to a network device 11, a network device 12, a network device 13, a network device 14, a network device 15, and a network device 16. FIG. 2 shows a bus network where central device 10 and network devices 11-16 are all coupled as shown to a bus 20. Star and bus type networks are limited in that they require that there exist for every network device 11-16 an information path directly to central device 10.

In FIG. 3 central device 10 and network devices 11-16 are coupled in a loop network. In the loop network shown in FIG. 3, information flows around the loop in a clockwise direction. Therefore, in order for central device 10 to communicate with network device 15, a message is passed from central device 10 through network device 11, through network device 12, through network device 12, through network device 14, to network device 15. Network device 15 may send a message through network device 16 to central device 10 to acknowledge receipt of the message.

The addition of network devices to the star network shown in FIG. 1 may be limited by available connection ports to central device 10. Similarly, the addition of network devices to the bus network shown in FIG. 2 may be limited by available connection ports to bus 20. However, unlimited network devices may be added to the loop network shown in FIG. 3. In order to add a network device 17 between network device 16 and central device 10 the output of the network device 16 could be directed into network device 17 and the output of network device 17 could be directed into central device 10.

SUMMARY OF THE INVENTION

In accordance with the preferred embodiment of the present invention, a serial network architecture is presented. The network architecture consists of a central device and one or more network devices coupled serially. An information packet is transferred serially from the central device through each network device until a last network device is reached. The last network device returns the information packets to the central device serially back through the network devices.

BRIEF DESCRIPTION OF THE DRAWINGS

FIG. 6A and FIG. 6B show a network device in accordance with the preferred embodiment of the present invention.

FIG. 7 shows a 15-bit data frame used with the network architecture shown in FIG. 5.

DESCRIPTION OF THE PREFERRED EMBODIMENT

Figure 1:
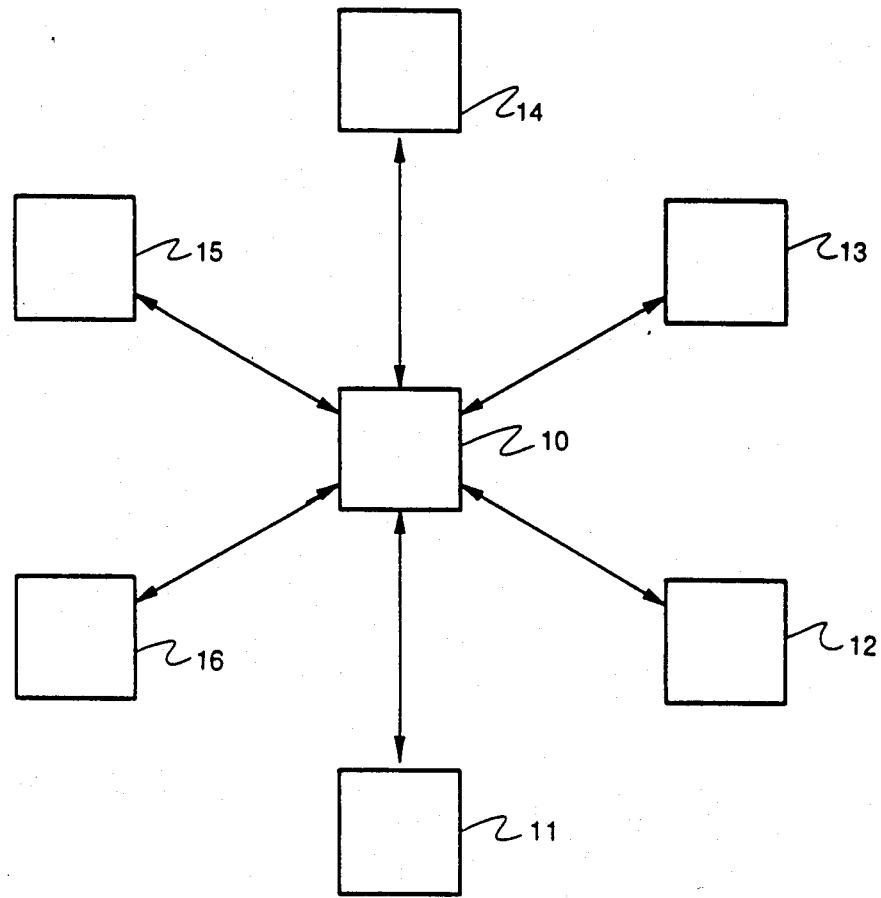
FIG. 1, FIG. 2, and FIG. 3 show prior art network architectures.
Figure 2:
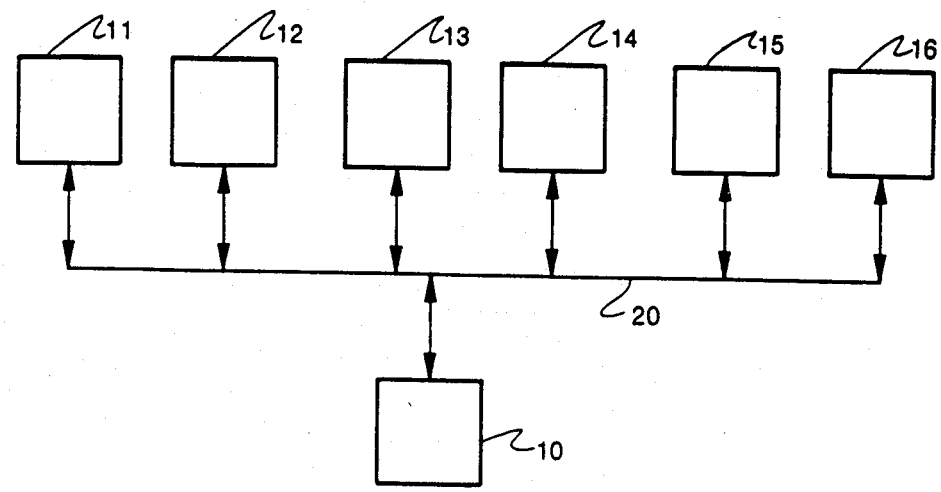
Figure 3:
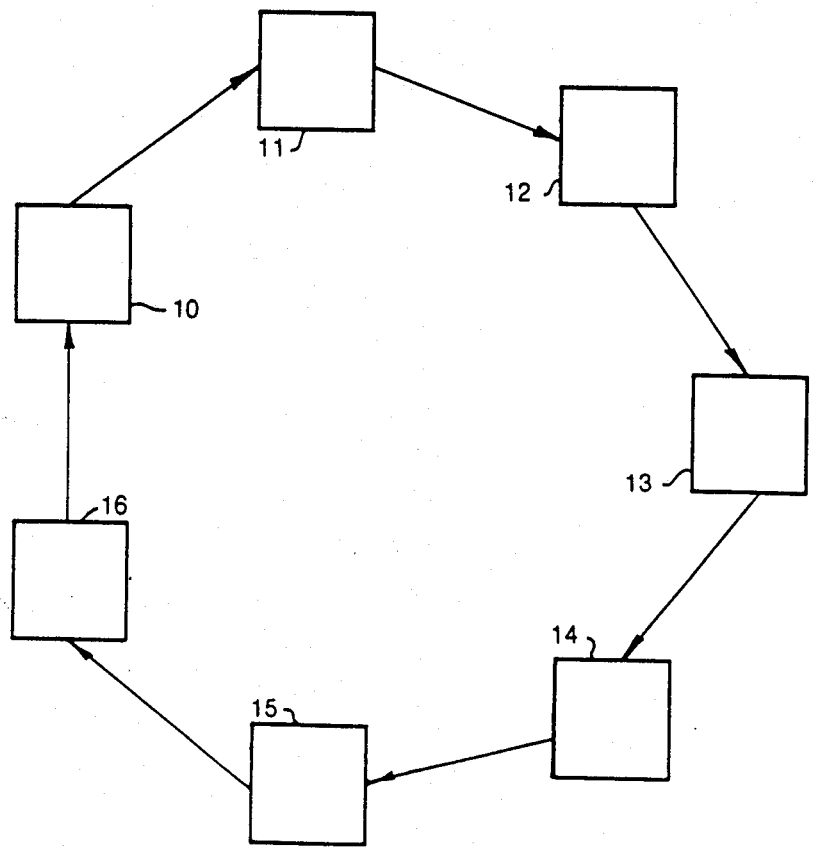
Figure 4:
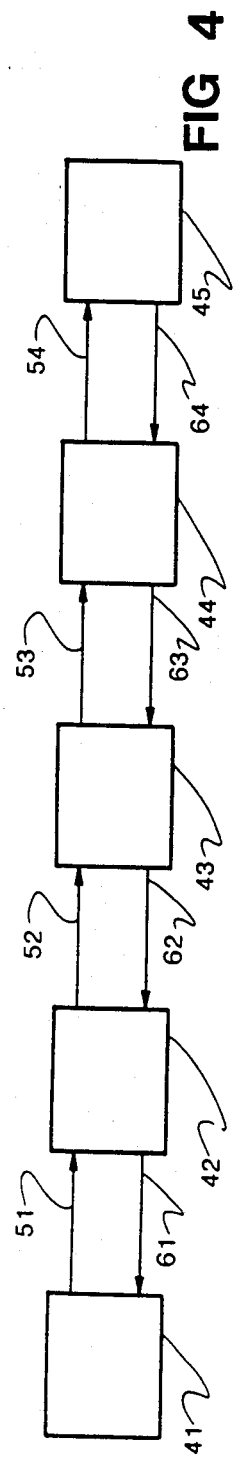
FIG. 4 shows a network architecture in accordance with the preferred embodiment of the present invention.

FIG. 4 shows a network architecture in accordance with the preferred embodiment of the present invention. A central device 41 is coupled serially to network devices 42, 43, 44, and 45. Information from central device 41 flows through data paths 51, 52, 53, and 54. Network devices 45 receives information from data path 54 and returns information through network devices 44, 43, and 42 to central device 41, by way of data paths 64, 63, 62, and 61.

Figure 5:
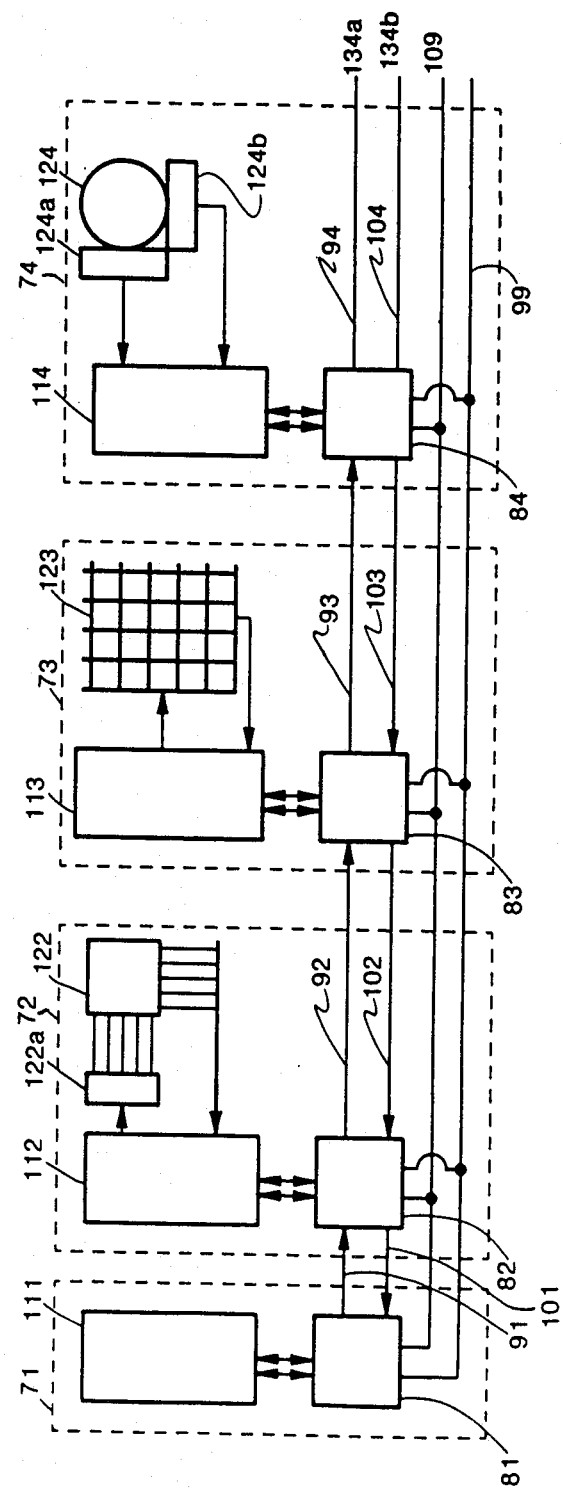
FIG. 5 shows a network architecture in accordance with the preferred embodiment of the present invention incorporated in user oriented devices.

FIG. 5 shows how the network architecture shown in FIG. 4 may be incorporated in a network for user oriented devices. A network interface device 71 may form part of a computer system. Within network interface device 71 may reside, for instance, a microprocessor 111 such as a 8086 manufactured by Intel Corporation of Santa Clara, Calif., and a central processor 81. Central processor 81 may be any processor or series of processors capable of handling the protocol described below. Through a send data path 91 and a return data path 101, central processor 81 is coupled to a network processor 82. Network processor 82 is coupled to a network processor 83 through a send data path 92 and a return data path 102. Network processor 83 is coupled to a network processor 84 through a send data path 93 and a return data path 103. Network processors 82, 83, and 84 may each be any processor or series of processor capable of handling the protocol described below.

Network processor 82 is shown is coupled to a microcontroller 112 within a user oriented device (touchscreen circuit) 72, network processor 83 is coupled to a microcontroller 113 within a user oriented device (keyboard circuit) 73, and network processor 84 is coupled to a microcontroller 114 within in a user oriented device (mouse circuit) 74. Microcontrollers 112-114 may each be, for instance, a COP 420, a COP 440 or a COP 2440, all of which are manufactured by National Semiconductor Corporation of Santa Clara, Calif. Microcontroller 112 is shown coupled to a touchscreen 122 through a touchscreen interface 122a. Microcontroller 113 is shown coupled to a keyboard 123, and microcontroller is shown coupled to a ball 124 through encoders 124a and 124b.

Additional network devices can be added to the network shown in FIG. 5 through a port 134a and a port 134b. Port 134a is coupled to network processor 84 through a send data path 94, and port 134b is coupled to network processor 84 through a return data path 94. Network processors 82-84 along with any other processors added are collectively referred to as a (the) link. A power line 109 and a ground line 99 may also be coupled from network interface device 71 to each user oriented device 72-74 so that user oriented devices 72-74 do not need a separate power supply.

FIG. 6A shows how information flows through network processor 83. Information from send data path 92 flows in into network processor 83, is processed by an information processor 83a and flows out to send data path 93. Information from return data path 103 flows directly through network processor 83 to return data path 102. Because network processor 83 sends information it receives to data path 93, it is said to be in passthru mode.

FIG. 6B shows how information flows through network processor 84. Information from send data path 93 flows into network processor 84, is processed by an information processor 84a and is directed to flow out to return data path 103. If another network processor were added to ports 134a and 134b (shown in FIG. 5), then information paths within network processor 84 would be configured to be similar to the information paths within network processor 83 (as shown in FIG. 6A). Because network processor 84 sends information back on return data path 103 it is said to be in loop back mode.

Many different protocols may be used by the network architecture. One embodiment, given as an example, sends data serially in fifteen bit data "frames". A frame 140 is shown in FIG. 7. Bit 141 is a start bit indicating that a frame follows. In this embodiment, start bit 141 is always a "0".

Bits 142-144 are address bits. Address bits 142-144 may be used to address up to seven user oriented devices, leaving an address (000) to be used as a universal address.

A bit 145 is a "1" if frame 140 contains data and a "0" if frame 140 contains an encoded command. Bits 146-153 contain a byte of data or an encoded command as indicated by bit 145. Bit 154 is a parity bit used for error detection. Bit 155 is a stop bit, in this embodiment always a "1".

Upon initial activation, or whenever user oriented devices are added or subtracted from the network shown in FIG. 5, each user oriented device needs to be assigned an address. The process of assigning addresses to each user oriented device in the network is called configuration. Configuration may be performed as follows.

Central processor 81 first sends out a reset command, specifically a Device Hard Reset command ($FE_{hex}$, see below for a table of commands and their hexadecimal representation). The Device Hard Reset command is sent with the universal address (000). Network processor 82 receives the Device Hard Reset command, resets microcontroller 122, and retransmits the Device Hard Reset Command to Network processor 83. Network processor 83 resets microcontroller 113 and retransmits the Device Hard Reset Command to Network processor 84, and so on. Upon receipt of the Device Hard Reset Command each network processor 82-84 goes into loop back mode.

Central processor 81 then individually assigns each network processor 82-84 an address. Central processor 81 sends an Interface Clear (IFC) Command ($00_{hex}$) with a universal address. Upon receipt and after performing a self test operation to assure its interface with microcontroller 112, network processor 82 loops the IFC command directly back to central processor 81.

Central processor 81 then sends a configuration command, specifically an Auto Configure command ($09_{hex}$), using the universal address. Network processor 82 receives the Auto Configure command, notes that it is device #1, increments the Auto Configure command from $09_{hex}$ to $0A_{hex}$, and loops the Auto Configure command directly back to central processor 81.

At this point central processor is done configuring network processor 82, so it sends to network processor 82 an Enter Passthru Mode command (01) with an address (in address bits 142-144) of $1_{hex}$. Network processor 82 then goes into passthru mode (meaning it will then pass through all messages it receives to Network processor 83). The Passthru Mode command is forwarded to network processor 83, which loops the message back to central processor 81 through network processor 82.

Central processor 81 is now ready to configure network processor 83. Central processor 81 sends an IFC command to network processor 82. Since network processor is already configured it ignores this command and forwards the IFC command to network processor 83. Network processor loops the IFC command back to central processor 81.

Central processor 81 then sends an Auto Configure command (09). Network processor 82 receives the command, increments the $09_{hex}$ to $0A_{hex}$, and retransmits the command to network processor 83. Network processor 83 receives the Auto Configure command, notes that it is device #2. Network processor 83 then increments the Auto Configure command from $0A_{hex}$ to $0B_{hex}$ and loops the command back to central processor 81.

At this point central processor is done configuring network processor 83, so it sends to network processor 83 an Enter Passthru Mode command (01) with an address (in address bits 142-144) of $2_{hex}$. Network processor 82 receives this command, notes that it is not addressed to Device #1, and so merely passes the message on to Network processor 83. Network processor 83 sees tha the Enter Passthru Mode command is addressed to it (Device #2), so it goes into passthru mode (meaning it will then pass through all messages it receives to Network processor 84).

Central processor repeats the above configuring sequence with network processor 84, and with as many other network processors as are coupled to the network. The Auto Configure command is incremented by each network processor before sending it to the next network processor (if it is in passthru mode) or back to the central processor (if it is in loopback mode). The Auto Configure command is incremented in the following sequence as it travels through each network processor:

$$09 \rightarrow 0A \rightarrow 0B \rightarrow 0C \rightarrow 0D \rightarrow 0E \rightarrow 0F \rightarrow 08$$

If a network processor receives an Auto Configure command which has been incremented to (08), then it knows that there are more than seven devices on the line. The network processor receiving a $08_{hex}$ in bits 146-153 would generate a Configure Error command ($FD_{hex}$) and sends it back to central processor 81. Presumably, at this point an error message is sent to a user who would remove some user oriented device from the network, limiting the number to 7.

If in the course of configuring the network, central processor 81 sends out an Enter Passthru Mode command to a network processor, which is device #n (where n is a positive integer less than or equal to 7), and does not get a command back, then that means that device #n is the last device on the chain. So, after waiting for a specified length of time (e.g. 1/60 of a second), central processor 81 sends out an Enter Loopback Mode command (02) with addressed to device #n. At this point the network has been configured. Now central processor can send an Identify and Describe command (03) to each network processor 82-84, to find out what kind of device it is and what information it provides. The device will respond with a descriptor in an agreed upon format.

Once central processor 81 is ready to receive data from the link, it sends a Poll command ($10_{hex}$) with the universal address field. Network processor 82 receives this command, and if it has no data for central processor 81, it immediately forwards the Poll command to network processor 83. If network processor 82 does have information to return it performs the following sequence:

(1) transmits a poll response header frame with an address of $1_{hex}$ indicating the data is from device #1. The frame would include 8 bits of data in bits 146-153 which would inform central processor 81 and/or microprocessor 111 the format of the data bits to follow.

(2) transmits data frames (with an address of $1_{hex}$).

(3) adds a number equal to the number of data frames (the number of data frames would include the poll response frame) transmitted to the low nibble (bits 150-153) of the original Poll command, and then forwards the modified Poll command to network processor 83. For instance, if network processor 82 sent out 8 frames, it would increment bits 146-153 to be $18_{hex}$.

Network processor 83 performs in a manner similar to network processor 82. However, no more than fifteen frames may be sent in response to a Poll command. So, if network processor 83 sees that its response to the Poll command would require it to increment bits 150-153 to be greater than 15 (e.g., if network processor 82 sent out 8 frames, network processor 83 could send out 7 or fewer frames), then it will send the Poll command on to network processor 84 unmodified, and wait for the next Poll command.

Central processor 81 receives this data and forwards it to microprocessor 111. Central processor 81 may be prompted by microprocessor 111 to issue additional Poll commands, or central processor 81 may do so automatically.

The following table gives a summary of the commands listed with the hexadecimal encoded values within bits 146-153.

TABLE 1

| Command (hex value): | Name: |
|---|---|
| 00 | Interface Clear (IFC) |
| 01 | Enter Passthur Mode |
| 02 | Enter Loopback Mode |
| 03 | Identify & Describe |
| 04 | Device Soft Reset |
| 05 | Perform Self Test |
| 06 | Command Trailer |

TABLE 1-continued

| Command (hex value): | Name: |
|---|---|
| 07 | Data Trailer |
| 09 (08 → OF) | Auto Configure |
| 10 (→ 1F) | Poll |
| 20 (→ 2F) | Repoll |
| 30 | Report Name |
| 31 | Report Status |
| 32 → 3C | not used / reserved |
| 3D | Disable Autorepeat |
| 3E | Enable Autorepeat, Cursor Rate = 1/30 second |
| 3F | Enable Autorepeat, Cursor Rate = 1/60 second |
| 40 → 47 | Prompt 0 → 7 |
| 48 → 4F | Acknowledge 0 → 7 |
| 50 → FA | not used / reserved |
| FB | Master Hard Reset |
| FC | Data Error |
| FD | Configure Error |
| FE | Device Hard Reset |
| FF | not used / prohibited |

What is claimed is:

1. In a computing system having a network comprising a central computing device and a plurality of computer peripheral devices coupled serially, a method for configuring the network comprising:

sending a reset command from the central computing device serially to each computer peripheral device of the plurality of computer peripheral devices;

sending a configuration command with an encoded address from the central computing device to a first computer peripheral device;

incrementing the address and sending the configuration command with the incremented address directly from the first computer peripheral device to the central computing device;

resending the configuration command with the original encoded address from the central computing device to the first computer peripheral device;

incrementing the address and sending the configuration command with the incremented address from the first computer peripheral device to a second computer peripheral device; and, incrementing the address a second time and sending the configuration command with the incremented address from the second computer peripheral device through the first computer peripheral device to the computing system.

* * * * *